Nov. 10, 1942.  R. A. MILLERMASTER  2,301,786
BOX AND CONDUIT ENCLOSURES FOR ELECTRIC WIRING
Filed March 6, 1941  2 Sheets-Sheet 1
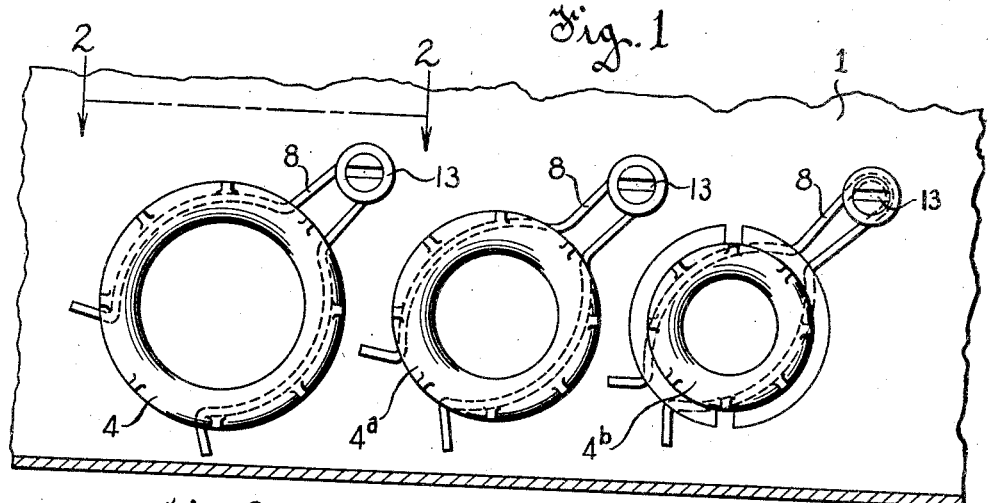
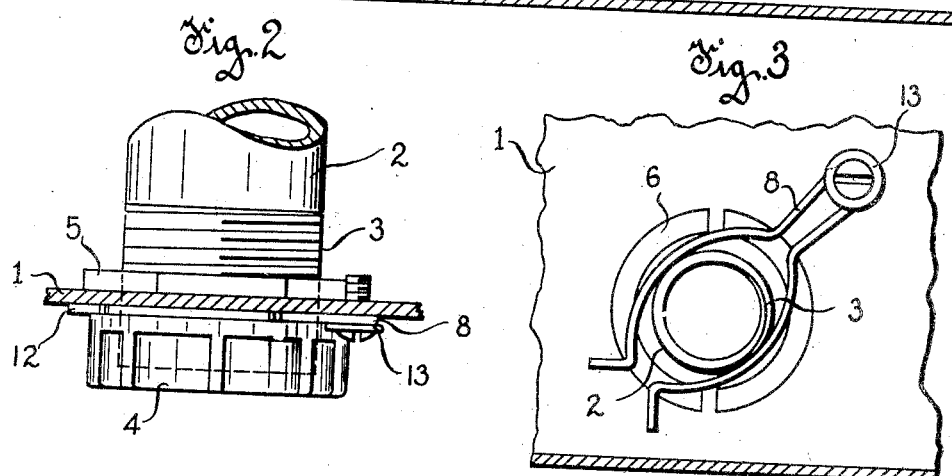
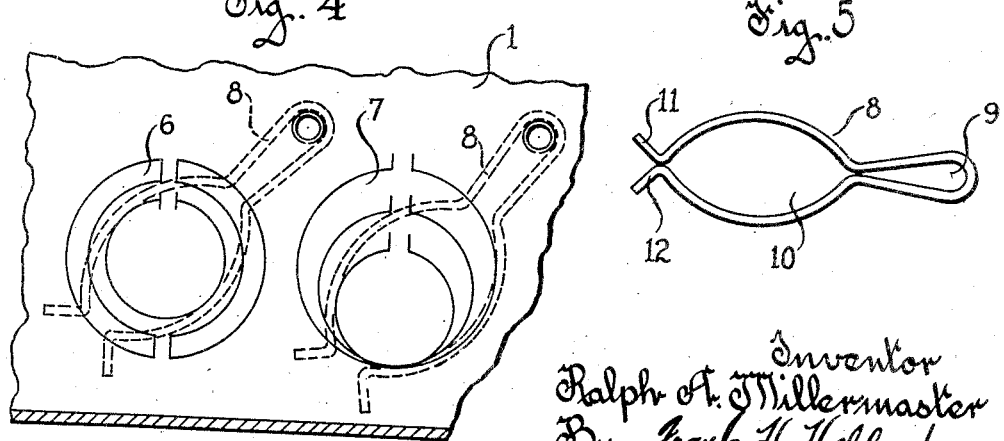
Inventor
Ralph A. Millermaster
By Frank H. Hubbard
Attorney

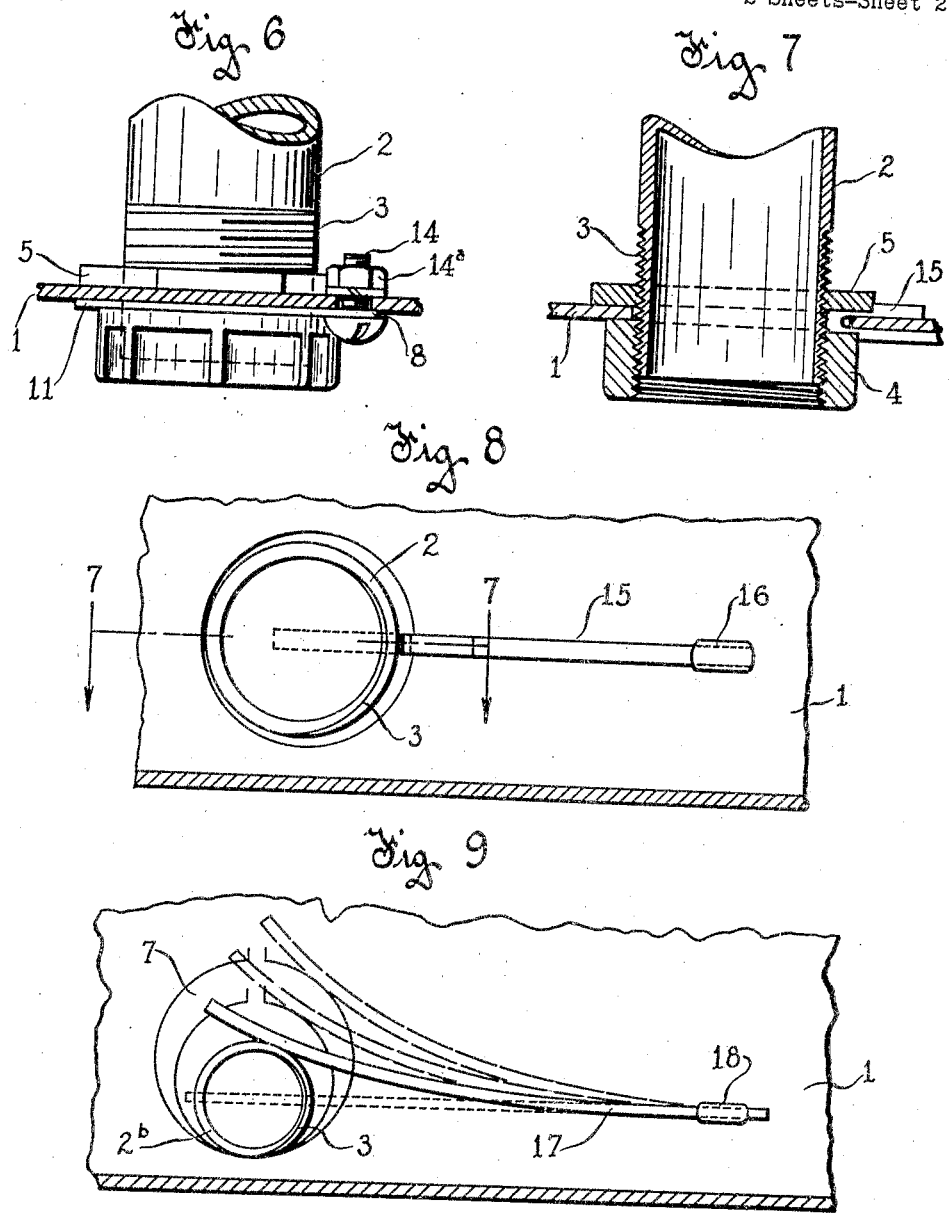

Patented Nov. 10, 1942

2,301,786

UNITED STATES PATENT OFFICE 2,301,786

BOX AND CONDUIT ENCLOSURE FOR ELECTRIC WIRING

Ralph A. Millermaster, Milwaukee, Wis., assignor to Cutler-Hammer, Inc., Milwaukee, Wis., a corporation of Delaware Application March 6, 1941, Serial No. 381,960

11 Claims. (Cl. 174—51)

This invention relates to sectional enclosures for electric wiring, and more particularly to bonding of the sections for electrical connection thereof.

Such sectional housing for wiring commonly comprises a metal box and one or more metal conduits leading into the box. The box is commonly provided with one or more multiple knockouts each to receive a conduit of any one of a number of diameters, each conduit being commonly clamped to the box wall by clamping members threading onto the conduit. The clamping members have commonly been relied upon to constitute a bonding or grounding jumper between the conduit and the box but the contact of the clamping members with the box is apt to afford a poor electrical connection, particularly when a conduit of minimum size is employed.

The present invention has among its objects to provide for such boxes and conduits a bonding jumper which may be readily attached to a conduit of any diameter to be dealt with and which may be connected to the box at a given point on the latter regardless of the diameter of the conduit to which the jumper must be adapted.

Another object is to provide for clamping of the jumper by the means employed to clamp the conduit to the box.

Another object is to provide a jumper which when attached to the box and not in use will be self-sustaining beyond its point of attachment to lie close to a wall of the box to be out of the way.

Another object is to provide such a jumper of high electrical conductivity.

Numerous other objects and advantages of the invention will hereinafter appear.

Certain embodiments of the invention are illustrated in the accompanying drawings, and the same will now be described, it being understood that the embodiments illustrated are susceptible of various modifications without departing from the scope of the appended claims.

In the drawings, Figure 1 shows a section of a box equipped, for purposes of illustration, with three like bonding jumpers adapted to three conduits of different diameters;

Fig. 2 is a view, partly in top plan and partly in section on the line 2—2 of Fig. 1;

Fig. 3 shows a portion of the structure of Fig. 1 with the inner conduit clamping member removed;

Fig. 4 shows a portion of a box having a multiple knockout of the concentric type and a multiple knockout of the eccentric type;

Fig. 5 shows a single bonding jumper of the type embodied in Figs. 1 to 4, illustrating the normal positions assumed by the jumper arms;

Fig. 6 is a view similar to Fig. 2 with a like bonding jumper but with a modified connection between the jumper and the box wall;

Figs. 7 and 8 are views similar to Figs. 6 and 3, respectively, but showing a modified form of bonding jumper; and Fig. 9 is a view similar to Fig. 8 showing another form of bonding jumper.

Referring to Figs. 1 to 4, the same show a wall 1 of an ordinary sheet metal box, to receive one or more conduits 2 of usual form. The extremity of each conduit passing through the box wall has the usual screw threads 3 for threading onto the conduit the usual bushing (such as 4, Figs. 1 and 2) and its complementary clamping nut 5.

As shown in Fig. 4, the box wall may be provided with a multiple concentric knockout 6 or a multiple eccentric knockout 7, or both.

All bonding jumpers shown in Figs. 1 to 4 are in form and size like that shown in Fig. 5, said jumper in all cases being designated by reference numeral 8 and comprising a resilient wire of good conducting material bent back upon itself to form a relatively small loop 9, and a relatively large loop 10, the extremities 11 and 12 of the wire being divergent, while the portions of the arms of the jumper at oppostie ends of loop 10 are preferably normally positioned closely adjacent to each other. The loop 9 is formed to receive a bolt or screw 13 for securement of the jumper to the box wall while the loop 10 which may be readily expanded is provided to receive the conduit, the wire forming the jumper acting by virtue of its resiliency to grip the conduit.

As shown in Fig. 1, a jumper 8 of the same size is employed for each of three conduits of different diameters, the jumper in each case having at least two points of contact with the conduit, and as shown in Figs. 1 and 2 the portions of each jumper contiguous to the respective conduit lie between the respective bushings 4, 4ª and 4ᵇ and the box wall 1 (Fig. 1) to be clamped therebetween when the bushings 4, 4ª or 4ᵇ and their respectively associated nuts (preferably of a size substantially corresponding to the size of the bushing, one of said nuts being shown at 5) are drawn together to clamp the conduit to the box wall. As will be apparent, the jumpers may be attached to the box wall either before or after the conduit is led into the box. If the jumpers are attached before the conduits are led into the box then it is merely necessary to spread each jumper to receive its conduit. If, on the other hand, the jumpers are detached each may be easily pushed onto its conduit by pressing the diverging ends thereof against the conduit.

As shown in Fig. 4 wherein the jumpers are merely dotted in, the same form and size of jumper is adaptable to either a multiple concentric knockout or a multiple eccentric knockout; the angular position of the jumper as a whole depending upon the particular type of the knockout. As shown in this figure the jumpers are adapted to the knockouts of minimum diameter.

In Figs. 1 to 4 the elements 13 for securing the jumpers to the box wall comprise screws threading into the box wall.

However, as illustrated in Fig. 6, showing employment of the same form of bonding jumper, the securing means may comprise a bolt 14 passing freely through the box wall, for cooperative engagement with a nut 14ª. This form of securing means avoids need and expense of threading the receiving opening in the box wall. Moreover where need of threading said opening is avoided and where there is a possibility that some knockouts will not be used the jumpers may be furnished separately and the box may be formed with small knockouts to afford openings for the securing bolts 14 of the jumpers, these small knockouts being left undisturbed when not required for use.

Referring to Figs. 7 and 8, the bonding jumper comprises a strip 15 of suitable highly conducting material (such as soft copper) preferably rectangular in cross section having stiffness and bendability but being of relatively slight resiliency. This strip may be suitably secured to the box wall at 16, as by welding, said strip normally extending from its point of attachment to a point approximating the center of the multiple knockout with which it is associated, such knockout being of either the concentric or eccentric type. After the knockout has been prepared for entrance of the desired conduit the free end of the strip 15 is led through the knockout opening and is folded back on the outer side of the box wall, as best shown in Fig. 7. The conduit is then led into the box after which clamping members 5 and 4 are drawn together both to clamp the conduit to the box and to clamp the jumper, with tendency to cause the metal of the jumper at its bend to flow or press against the conduit, thus providing a good electrical connection.

Referring to Fig. 9, the bonding jumper shown therein comprises a resilient wire 17 of high electrical conductivity secured to the box wall at point 18, as by welding. This wire normally is straight, as indicated by dotted lines, and extends from its point of connection to the box to a point on the far side of its associated knockout of minimum dimension. As shown in full lines, the jumper is flexed to engage a conduit 2ᵇ of minimum diameter. Other sections of the knockout shown are eccentric to the section of minimum diameter and as shown by dash lines the jumper 17 may be further flexed to adapt it to the larger sizes of conduit receivable by the knockout. In practice a small bushing, such as that shown at 4ᵇ in Fig. 1 would be threaded onto conduit 2ᵇ only to such an extent that it would not apply any substantial degree of pressure upon jumper 17; whereupon the nut (not shown) at the opposite side of plate 1 would be tightened without resulting in any tendency of jumper 17 to move out of electrical engagement with conduit 2ᵇ. If desired, jumper 17 may be attached to plate 1 at a point 180 degrees removed from that illustrated, so as to extend across the knockout areas in the opposite direction; in which case the bushing, such as 4ᵇ of Fig. 1, may be tightened after the desired adjustment of the external nut, with a consequent tendency to increase the degree of pressure of jumper 17 against the conduit, such as 2ᵇ, as will be obvious.

What I claim as new and desire to secure by Letters Patent is:

1. In combination, a flat sheet metal plate having a multiple knockout comprising a plurality of partially sheared elements for passage therethrough of a conduit of any of a number of different diameters, a conduit extending through said plate and having means to clamp it thereto, and a bonding jumper for electrically connecting said conduit and said plate, said jumper comprising a relatively stiff but bendable element having one end rigidly attached to said plate and having its other end led through the conduit opening afforded by the knockout and folded back onto the plate to be clamped adjacent the conduit between said plate and a part of the means for clamping said conduit to said plate.

2. In combination, a conduit, a flat sheet metal plate having a multiple knockout comprising a plurality of partially sheared elements for passage therethrough of a conduit of any of a number of different diameters, and a bonding jumper for electrically connecting the conduit to said plate, said bonding jumper comprising a resilient, self-sustaining conductor attached at one end to said plate and extending a substantial distance across its associated knockout, said jumper being adapted by its resiliency to be flexed to give clearance for a conduit of any of the aforementioned diameters and to cause it when released to make contact with the conduit.

3. In combination, a metal conduit, a flat sheet metal plate having a multiple knockout comprising a plurality of partially sheared elements for permitting passage through said plate of a conduit of any one of a number of different diameters, a highly conducting bonding jumper for electrically connecting the conduit to said plate, said bonding jumper comprising a self-sustaining resilient conductor rigidly attached at one end by welding to said plate and extending a substantial distance across the area of each of the knockout sections, said jumper being adapted by its resiliency to be flexed to give clearance for a conduit of any of the aforementioned diameters and to cause it to press against said conduit to afford a good electrical connection between said parts, and associated means to clamp the conduit to said plate without decreasing the quality of the aforementioned electrical connection.

4. In combination, a flat sheet metal plate having a multiple knockout comprising a plurality of partially sheared elements for passage therethrough of a conduit of any one of a number of different diameters, a threaded conduit extending through said plate and having cooperatively threaded means to clamp it thereto, and a bonding jumper for electrically connecting said conduit and said plate, said jumper comprising a relatively stiff but bendable metal element of good electrical conductivity having one end rigidly attached to said plate and having its other end led through the conduit opening afforded by the knockout and folded back onto the plate to be clamped adjacent the conduit between said plate and a part of the means for clamping said conduit to said plate, the arrangement being such that the material of said jumper element is pressed into engagement with said conduit to afford a good electrical connection as an incident to the clamping operation.

5. The combination with a flat sheet metal plate having a multiple knockout, comprising a plurality of nested elements sheared from said plate throughout the major portion of the periphery of each of the former, for passage therethrough of the end of a conduit of any one of a number of different diameters, of means for clamping the conduit end to said plate, a pre-formed, self-sustaining, bendable bonding jumper for electrical connection of the conduit to said plate, said jumper being positioned throughout its length against said plate and having one end portion rigidly mechanically and electrically connected to said plate at a predetermined point exteriorly of said knockout and a free end portion adapted for cooperative engagement with a conduit of any of the aforementioned diameters, and said free end portion of the jumper being interposed between said clamping means and said plate.

6. The combination with a sheet metal box having a multiple knockout formed in one flat wall thereof, for passage therethrough of the end of a conduit of any one of a number of different diameters, said knockout comprising a plurality of nested elements sheared from said wall throughout the major portion of the periphery of each of the former, of a pre-formed, self-sustaining, bendable bonding jumper for electrical connection of the conduit to said wall, said jumper having one end portion rigidly connected to said wall at a predetermined point at one side of said multiple knockout and having a free end portion cooperatively engaged with a conduit of any of the aforementioned diameters, and associated means comprising a bushing operable to clamp the conduit to said wall and additionally acting as a clamp for said free end portion of the jumper.

7. The combination with a flat sheet metal plate having a multiple knockout, comprising a plurality of nested elements sheared from said plate throughout the major portion of the periphery of each of the former, for passage therethrough of the end of a conduit of any one of a number of different diameters, of means for clamping the conduit end to said plate, a pre-formed, bendable bonding jumper electrically connecting the conduit to said plate, said jumper having one end portion rigidly connected to said plate exteriorly of said multiple knockout and a a free end portion for cooperative engagement with a conduit of any of the aforementioned diameters, said jumper having stiffness to render it self-sustaining throughout its length and to retain the same in close proximity to said plate, and the same being clampingly engaged by said clamping means.

8. The combination with a flat sheet metal plate having a multiple knockout, comprising a plurality of nested elements sheared from said plate throughout the major portion of the periphery of each of the former, for passage therethrough of a conduit of any one of a number of different diameters, of a pre-formed, bendable bonding jumper electrically connecting the conduit to said plate, said jumper having one end portion thereof rigidly secured to said plate at a predetermined point exteriorly of said multiple knockout and having a free end portion overlying and engaging each element of said multiple knockout, and said jumper consisting of resilient, self-sustaining material whereby said free end portion thereof may be flexed in a plane parallel to said plate to accommodate and resiliently engage a conduit of any of the aforementioned diameters.

9. The combination with a flat sheet metal plate having a multiple knockout, comprising a plurality of nested elements sheared from said plate throughout the major portion of the periphery of each of the former, for passage therethrough of a conduit of any one of a number of different diameters, of a pre-formed, bendable bonding jumper electrically connecting the conduit to said plate, said jumper having one end portion thereof rigidly secured to said plate at a predetermined point exteriorly of said multiple knockout and having a free end portion overlying and engaging each element of said multiple knockout, said jumper consisting of resilient, self-sustaining material whereby said free end portion thereof may be flexed in a plane parallel to said plate to accommodate and resiliently engage a conduit of any of the aforementioned diameters, and associated means operable to clamp the conduit to said plate and also acting to clamp said free end portion of the jumper to said plate in a relationship contiguous to the conduit.

10. In combination, a sheet metal housing for an electrical device, said housing having a multiple knockout in one flat wall thereof, said knockout comprising a plurality of nested elements sheared from said wall throughout the major portion of the periphery of each of the former, for passage therethrough of a conduit of any one of a number of different diameters, and a bonding jumper for insuring a good electrical connection between said conduit and said plate, said jumper comprising a resilient wire of good electrical conductivity bent back upon itself at substantially the mid-length thereof to provide a pair of arms forming a spreadable loop overlying said multiple knockout to yieldably accommodate conduits of different diameters, and means for rigidly mechanically and electrically connecting the bent portion of said jumper to said plate at a predetermined point exteriorly of said multiple knockout.

11. In combination, a sheet metal housing for an electrical device, said housing having a multiple knockout in one flat wall thereof, said knockout comprising a plurality of nested elements sheared from said wall throughout the major portion of the periphery of each of the former, for passage therethrough of a conduit of any one of a number of different diameters, a bonding jumper for insuring a good electrical connection between said conduit and said wall, said jumper comprising a resilient wire of good electrical conductivity bent back upon itself at substantially the mid-length thereof to provide a pair of arms which are respectively formed to jointly provide a relatively small loop including said bend, the free ends of said arms being formed to provide a relatively larger spreadable loop overlying said multiple knockout to selectively receive therebetween conduits of different diameters, and associated means comprising a screw penetrating said wall exteriorly of said multiple knockout, the head of said screw being adapted to mechanically clamp and thereby electrically connect said relatively small loop to said wall.

RALPH A. MILLERMASTER.